United States Patent

Fischer et al.

(10) Patent No.: US 6,701,454 B1
(45) Date of Patent: Mar. 2, 2004

(54) METHOD AND SYSTEM FOR RECOVERING INFORMATION DURING A PROGRAM FAILURE

(75) Inventors: Kevin Joseph Fischer, Redmond, WA (US); Eric Fox, Seattle, WA (US); Eric A. LeVine, Seattle, WA (US); Brian T. Hill, Renton, WA (US); Michael R. Marcelais, Redmond, WA (US); Jeffrey Larsson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 09/588,165

(22) Filed: Jun. 5, 2000

(51) Int. Cl.⁷ .................................. G06F 11/00
(52) U.S. Cl. ............................. 714/15; 714/38
(58) Field of Search ................. 714/15, 38, 20; 707/202

(56) References Cited

U.S. PATENT DOCUMENTS

| | | | |
|---|---|---|---|
| 5,241,672 A | * 8/1993 | Slomcenski et al. | 707/202 |
| 5,524,190 A | * 6/1996 | Schaeffer et al. | 715/522 |
| 5,682,551 A | * 10/1997 | Pawlowski et al. | 710/36 |
| 5,948,112 A | * 9/1999 | Shimada et al. | 714/16 |
| 6,009,258 A | * 12/1999 | Elliott | 703/22 |
| 6,044,475 A | * 3/2000 | Chung et al. | 714/15 |
| 6,256,751 B1 | * 7/2001 | Meth et al. | 714/15 |
| 6,393,584 B1 | * 5/2002 | McLaren et al. | 714/14 |
| 6,430,703 B1 | * 8/2002 | Connor et al. | 714/20 |
| 6,438,709 B2 | * 8/2002 | Poisner | 714/23 |
| 6,457,142 B1 | * 9/2002 | Klemm et al. | 714/38 |
| 6,591,379 B1 | * 7/2003 | LeVine et al. | 714/38 |

* cited by examiner

Primary Examiner—Scott Baderman
Assistant Examiner—Joshua Lohn
(74) Attorney, Agent, or Firm—Merchant & Gould

(57) ABSTRACT

Method and system for recovering information from open files during a failure in a program module. Once a failure is detected in the program module, control passes to an exception handler that determines whether the open files have been modified. If so, the open files are verified and stored as recovery versions of the files at the time of the failure. The program module is then terminated and restarted. Upon restarting the program module, the recovery version of the file at the time of the failure is opened and displayed to the user.

27 Claims, 3 Drawing Sheets

METHOD AND SYSTEM FOR RECOVERING INFORMATION DURING A PROGRAM FAILURE

TECHNICAL FIELD

This invention relates to software program modules. More particularly, this invention relates to a method and system for recovering information contained in open files during a failure in a program module.

BACKGROUND OF THE INVENTION

Despite the best efforts of software developers, software programs inevitably fail at one time or another. Unhandled failures may result in a crash, at which time the operating system terminates the, software program execution. When a program crashes, all of its state data is lost. As a result, users that were in the process of modifying a file, such as a document or spreadsheet, may lose substantial amounts of information. Information loss may create a significant amount of work and frustration to users.

To minimize the information lost as a result of a crash, several different approaches have been taken. For example, one prior art method comprises capturing a screen shot at the time of the crash. That method, however, is limited to salvaging only the information displayed on the screen at the time of the crash, if any. Thus, information that was not directly displayed is lost.

Another approach taken to recover information caused by program crashes involves saving open files automatically before the crash. More particularly, files are periodically saved in the background. This approach, however, only recovers the files as of the last auto-save. Accordingly, information that was not previously saved is lost.

A further prior art method uses exception handlers to clean up, or fix, the cause of the failure and return the user to a state before the failure. The user is then given the option of performing a normal save of the open document. For example, the application program POWERPOINT manufactured and sold by Microsoft Corporation of Redmond, Wash., has utilized such exception handlers. A crash, however, may be the culmination of a series of unexpected events that have occurred before the ultimate failure. Thus, considerable information may be lost in merely giving the user the option of doing a normal save as if the exception has never occurred.

Returning the user to the state before the failure and attempting to save the document often causes another failure while saving the document. Furthermore, if the save attempt is unsuccessful, then the modified changes in the document is lost and no other attempt is made to recover the information.

The above-described prior art methods for limiting information loss caused by a program crash suffer from varying disadvantages. Accordingly, there is a need for a method and system for saving the most recent version of an open file at the time of a program failure.

There is another need for a method and system for selecting the best version of the recovered file.

There is still a further need for using system APIs to implement the present invention that may be easily added to a software program without extensive changes to the program's architecture.

SUMMARY OF THE INVENTION

The present invention satisfies the above-described needs by providing a method and system for recovering information during a program failure. An exception handler is provided that performs an emergency save of any file that is open at the time of the crash.

Once a failure of the program module is detected, control passes to an exception handler that attempts to minimize the amount of information that might be lost. The exception handler allows a user to attempt an emergency save of all open files that have been modified. When the program is restarted, the most recent verified version is reloaded and displayed to the user.

More particularly, once a failure occurs in an application program module, the operating system passes control to the exception handler, which may display a user interface, such as a dialog box, asking the user whether an open file should be saved.

If the user selects to save the open file, then a determination is made whether the open file has been modified from the version currently saved to disk. The reader should appreciate that this determination can also be made before questioning the user. The exception handler then saves the file to a temporary location.

The exception handler then creates a Document Recovery Persistence ("DRP") in the computer registry for the file. A DRP comprises the data needed to analyze the best version available to the user subsequent to the failure. More particularly, the DRP is a record block that includes a path name, a time stamp, a process identifier, a unique numeric identifier for a version of the file, and a numeric identifier that is shared among the DRPs for each version of the file.

The program is then terminated and restarted. Upon restart, the DRP for each recovered file is accessed and compared with the DRPs, if any, for the original file and the timed auto-saved version of the file. Information in these DRPs is used to determine the best version based on the recentness and confidence level of each version. After determining which version of the file is the best, that version is then opened and displayed to the user.

In another embodiment of the invention, a user interface, such as a dialog box, may be displayed to the user providing the functionality of selecting between the different versions of the file. For example, the user may select and compare from the recovered, auto-saved, and user-saved versions. The selected version may then be stored as the original file or saved as a new file.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

DETAILED DESCRIPTION

Figure 1:
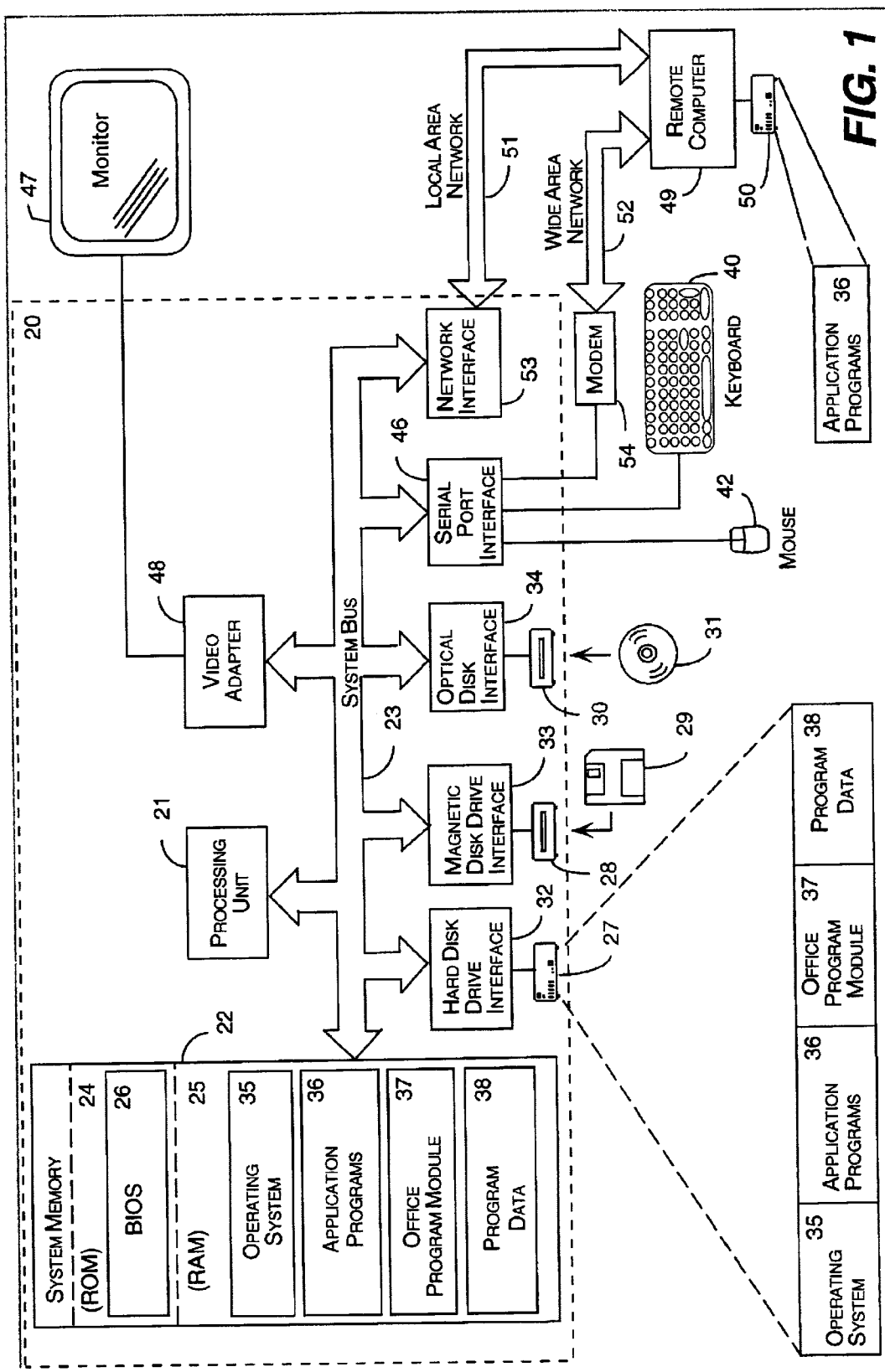
FIG. 1 is a block diagram of a computer that provides the exemplary operating environment for the present invention.

The present invention is directed to a method and system for recovering information during a program failure.

Unhandled failures may lead to a crash, at which time the program may be terminated by the operating system. When a program module crashes, all of its state data is lost. As a result, users that were in the process of modifying a file may lose substantial amounts of information. The present invention provides an exception handler that attempts to minimize the amount of information that is lost as a result of a crash. When an exception occurs, the exception handler allows a user to attempt an emergency save of all open files. When the program is restarted, the most recent verified version is reloaded and displayed to the user.

In one embodiment, the invention is incorporated into a program module, such as the "WORD" program manufactured and sold by Microsoft Corporation of Redmond, Wash. Briefly described, the "WORD" program module is a word processing application program. While the invention will be described in the specific context of the "WORD" program module running in conjunction with a personal computer, those skilled in the art will recognize that the invention may also be implemented with other program modules.

Having briefly described an embodiment of the present invention, an illustrative operating environment for the present invention is described below.

Illustrative Operating Environment

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52.

Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

System for Recovering Information During a Crash

In one embodiment, the present invention is a system for recovering information subsequent to a program module failure. An exception handler, such as the Global Unhandled Exception Filter, which performs an emergency save of open files, is included in the program module. An exception handler is a block of code that takes control, or executes, in the event of a failure, or unexpected exception.

Those skilled in the art should appreciate that a program module may have many (or no) layers of exception handlers.

Because different exception handlers may apply to different ranges of execution, the operating system will turn to particular exception handlers depending the particular exception. When no exception handler chooses to deal with an exception, the exception is handed to the Global Unhandled Exception Filter, provided the application had registered such a handler at some prior point in its current execution. This handler is the last line of defense for all exceptions, regardless of where they may occur in the program.

In the event of an exception, control is passed to the exception handler. The exception handler may then query the user whether the user wishes to attempt an emergency save of all open files. If so, the exception handler saves the files to a temporary file on a persistent medium, such as disk drive 27. Once the program is restarted, the user is allowed to view the files.

Figure 2:
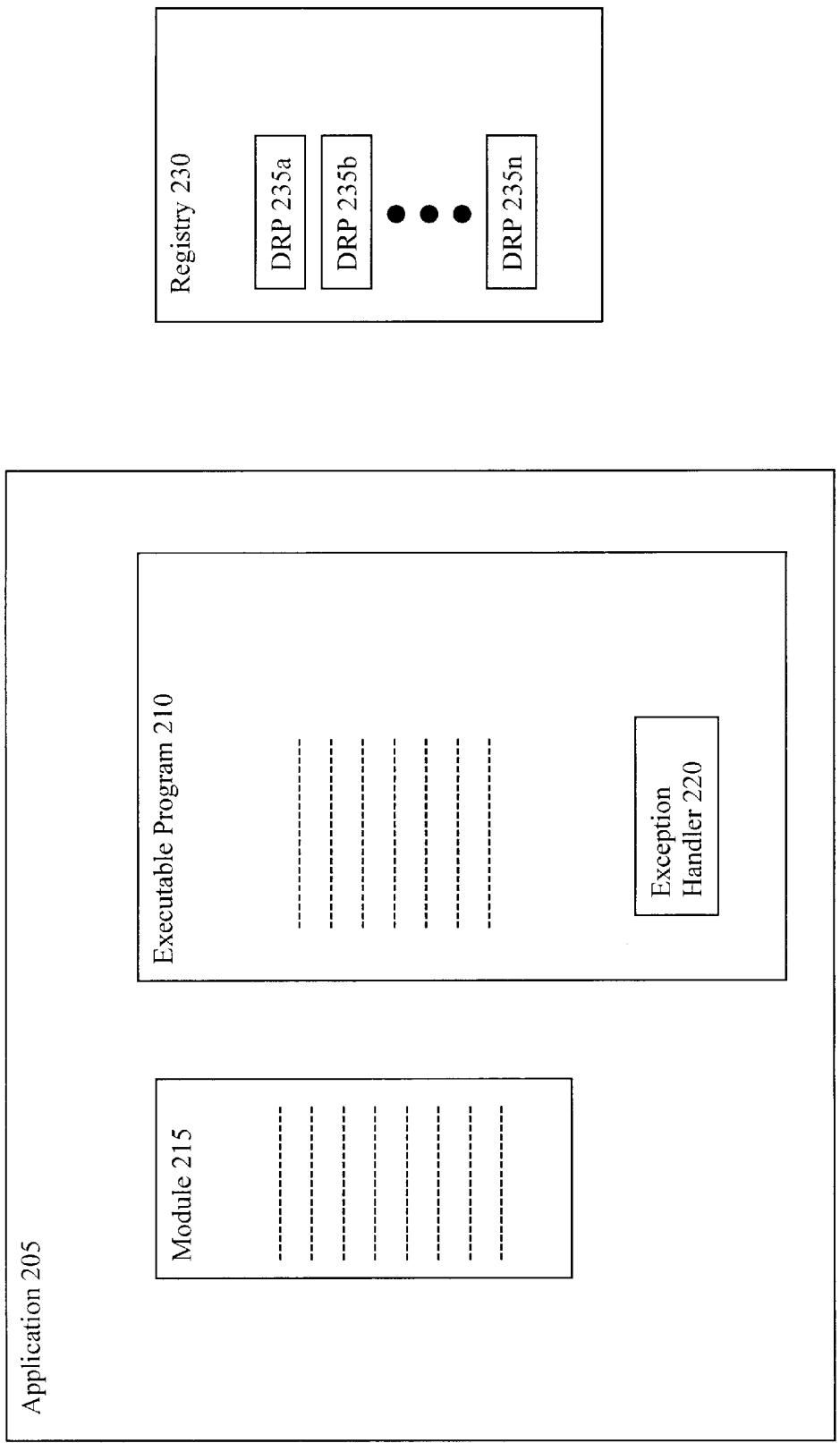
FIG. 2 is a component block diagram of an exemplary system for recovering information during a program failure in accordance with an embodiment of the present invention.

Referring now to FIG. 2, a block diagram of an illustrative system 200 for recovering information during a program failure in accordance with an embodiment of the present invention will be described. The system 200 comprises an application program module 205. For example, application program module 205 may be the "WORD" word processing program module, manufactured and sold by Microsoft Corporation of Redmond, Wash. and included in the "OFFICE" 37 (FIG. 1) suite of program modules.

The system 200 further comprises an executable program 210 running inside of application program module 205. For example, in the "WORD" word processor program module, the executable program may be "WinWord.exe". An executable program is a program that can be run and typically means a compiled program translated into machine code in a format that can be loaded into memory and run by a computer's processor. The lines of code in executable program 210 are illustrated as dashed lines in FIG. 2.

The system 200 further comprises a module 215 being executed by the executable program 210 inside the application program module 205 at the time of the failure. The module 215 may refer to a collection of routines and data structures that performs a particular task or implements a particular abstract data type. Modules usually comprise two parts: an interface, which lists the constants, data types, variables, and routines that can be accessed by other modules or routines, and an implementation, which is private (accessible only to the module) and which contains the source code that actually implements the routines in the module. For example, the module 215 may be a dynamic-link library such as "mso.dll". The lines of code in module 215 are illustrated as dashed lines in FIG. 2.

While system 200 is described above using source code, those skilled in the art should appreciate that the method and/or layout of a module's source code are not relevant to the exception handler's ability to handle the exception. The present invention can be used to handle exceptions generated by any executable code, regardless of whether it is well-written in a high-level programming language (as described above) or if it is hand-written directly into machine code. Furthermore, those skilled in the art should also appreciate that not only may the exception occur in the application program that contains the exception handler, it may alternatively occur in any code that the exception handler calls, including code that resides in the operating system. For example, various operating system functions, such as Windows APIs, may, under certain circumstances, raise exceptions.

Referring back to FIG. 2, the system 200 also comprises an exception handler 220. Several exception handling techniques are well known in the art and may be employed locally or globally within an executable program, such as executable program 210. When a failure (or exception) occurs, the exception handler 220 is executed.

A program raises an exception whenever something unexpected or illegal is attempted by the program. For example, suppose a failure occurs while executable program 210 is executing instructions running module 215. If executable program 210 has the exception handler 220 in place, then the exception handler 220 is executed when executable program 210 encounters an exception.

A crash may be defined as a failure or exception generated by the program module that is not handled by the program module. In other words, if no exception handlers exist or none of the program's exception handlers choose to handle the particular exception, the operating system then deals with the exception. Typically, the operating system shows the user a "crash" dialog and then terminates the program.

Those skilled in the art should appreciate that in the present invention, control is passed to the exception handler 220 before the program crashes. In the preferred embodiment of the present invention, the exception handler 220 is included in the application in order for control to be given to it in the event of an exception. It is preferable for the data recovery to be completed inside of the application because another application would not have simple access to, nor understanding of, the application data. Those skilled in the art should appreciate, however, that the exception handler 220 may also be implemented separately from the application program module 205 because of the possible instability of the application program module (having experienced a failure).

Once executed, exception handler 220 verifies and saves each open file and creates a Data Recovery Persistence ("DRP") block, such as DRP 235a, 235b . . . 235n, for each file, in a computer registry 230. A DRP is a record block that includes a set of information defining a version of a particular file.

In accordance with an embodiment of the present invention, the information in a DRP comprises a path name, a time stamp, a process identifier, and a unique numeric identifier for each available version of the file. In addition, a DRP includes a numeric identifier that is shared among the DRPs for each version of a file. Typically, an auto-saved version, a user-saved version, and a recovered version might be available to the user. The reader should appreciate that the auto-saved version is the most recent version of the file that has been saved automatically in the background. Similarly, the user-saved version is the most recent version of the file as saved by the user. Finally, the recovered version is the version of the file as it was at the time of the exception.

A DRP includes a variable that indicates what kind, or "flavor", of DRP it is, e.g., user-saved, auto-saved, or recovered. DRPs also have a unique numeric identifier for each available version of the file and a numeric identifier that is shared with the DRPs for the other flavors or versions of the file.

The path name included in a DRP is the directory location of a version of the open file. In other words, in an embodiment of the present invention, the auto-saved version, user-saved version, and the recovered version of a file would each be represented by a different DRP. Each DRP comprises a path name of the directory location of its respective version.

In addition to the path name, the DRPs may record a "friendly" name that may be displayed in a user interface when referring to a file. For example, the document's title rather than the file name may be displayed to the user in a dialog box. Furthermore, the DRPs may have an original path name that may be used to allow an auto-saved or recovered version DRP to keep track of the original (user-saved) file.

The time stamp is the date and time at which a version was saved. The process identifier is used to detect whether a DRP is still in use by another running instance of the executable program.

DRPs are stored in the computer registry 230 so that the path names, time stamps, and process identifications are maintained until the user decides which version(s) he wishes to save and which version(s) he wishes to delete.

Having described the system 200 for recovering information during a program module crash in accordance with an embodiment of the present invention, an illustrative method 300 will be described in reference to FIG. 3.

Illustrative Embodiment

Figure 3:
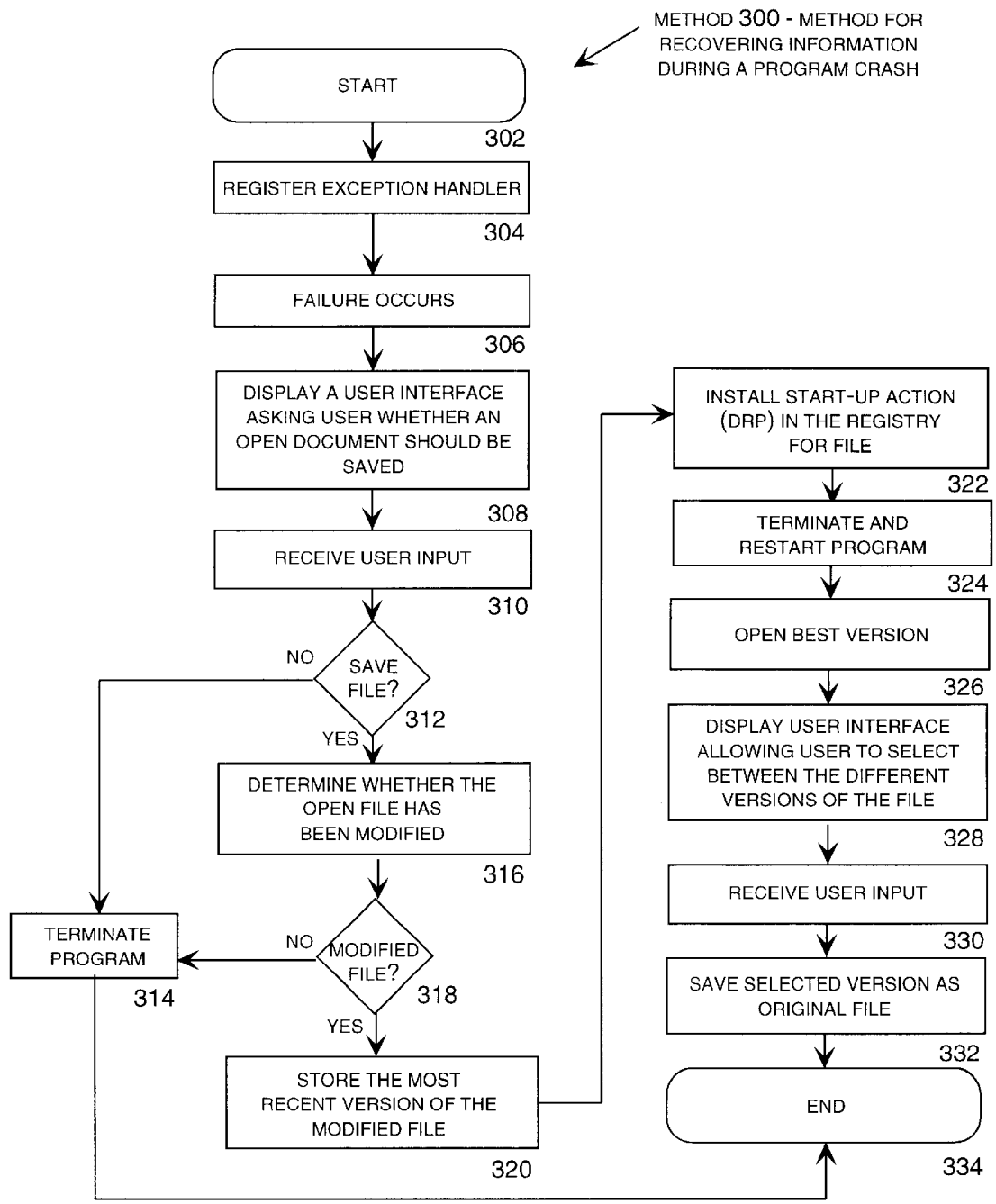
FIG. 3 is a flowchart illustrating an exemplary method for recovering information during a program failure in accordance with an embodiment of the present invention.

FIG. 3 is a flowchart illustrating an illustrative method 300 for recovering information during a program failure in accordance with an embodiment of the present invention. The method 300 will be described with reference to the elements of system 200 (FIG. 2).

Method 300 starts at step 302 and proceeds to step 304, where an exception handler 220 is registered with the operating system. In the preferred embodiment of the present invention, the exception handler is a global unhandled exception filter.

From step 304, method 300 proceeds to step 306, where a failure occurs in the application program module 205.

Method 300 then proceeds to step 308, where control is passed to the exception handler 220, which displays a user interface, such as a dialog box, asking the user whether an open file should be saved. The reader should appreciate that while the illustrative method 300 is described with a single open file, the present invention may be used to recover information from multiple open files. The user should further appreciate that alternate embodiments of the present invention may opt to recover data without confirmation from the user, and possibly without any user interface. From step 308, method 300 then proceeds to step 310.

At step 310, the exception handler 220 receives the user input and method 300 continues to decision block 312.

At decision block 312, if the user chooses not to save the open file, method 300 branches to step 314, where the exception handler terminates the program module 205. Method 300 then proceeds to step 334, where it ends.

If at decision block 312, however, the user chooses to save the open file, then method 300 continues to step 316, where a determination is made whether the open file has been modified. Specifically, the exception handler 220 determines whether the open file contains information that is unlike either the original saved version or the most recent auto-saved version. From step 316, method 300 continues to decision block 318.

If at decision block 318 the exception handler 220 determines the file has not been modified, method 300 branches to 314, where the program module 205 terminates. Method 300 then proceeds to step 334, where it ends. The reader should appreciate that a dialog box may also be displayed to the user to explain the open file has not been modified, and therefore, does not require a recovery version.

If, on the other hand, the exception handler 220 determines that the file has been modified, method 300 continues to step 320, where the file is stored on disk or in some other persistent medium. From step 320, method 300 proceeds to step 322.

At step 322, the exception handler 220 creates a DRP in the computer registry for the file. As described above, a DRP comprises the data needed to describe the best version available to the user as a result of the failure. More particularly, DRPs are record blocks that include a path name, a time stamp, a process identifier, and a unique numeric identifier for each available version of the file. In an embodiment of the present invention, an auto-saved version, a user-saved version, and a recovered version may be available. From step 322, method proceeds to step 324.

At step 324, the program is terminated and restarted. Method 300 then continues to step 326.

At step 326, the DRPs for the file are accessed to determine the best version based on the recentness and confidence level of each version. For example, the recovery version may be considered the best version if it is the most recent version of the file and no information was lost due to corruption. After determining which version of the file is the best, that version is then opened and displayed to the user.

From step 326, method 300 proceeds to step 328, where a user interface, such as a dialog box, may be displayed to the user providing the functionality of selecting between and comparing the different versions of the file. For example, the user may select from recovered, auto-saved, and user-saved versions. Thus, the user may make the ultimate decision as to which version constitutes the best version.

From step 328, method 300 proceeds to step 330, where the user's version selection is received.

Method 300 then continues to step 332, where the selected version is stored as the original file. The reader should appreciate that the alternate versions of the file may be deleted from memory once the selected version is saved as the original. Alternatively, the other versions may be also be stored as distinct files for future use. From step 332, method 300 proceeds to step 334, where it ends.

In alternative embodiments, the failure reporting executable may be placed outside the failed application program module because of the volatile state of the failed application program module.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for recovering information from an open file during a failure in a program module, the method comprising the steps of:

determining there is a failure in the program module;

in response to a determination that there is a failure in the program module, storing a recovery version of the file, wherein the recovery version is a version of the file as it was at the time of the failure in the program module;

terminating the program module;

restarting the program module; and displaying the recovery version of the file.

2. The method of claim 1, further comprising the steps of:

providing a user of the program module with an auto-saved version of the file;

providing the user of the program module with a user-saved version of the file; and providing a means to select among an auto-saved versions, a user-saved version, and a recovery version of the file.

3. The method of claim 2, further comprising the step of determining which is the best version of the file.

4. The method of claim 3, wherein the step of determining which is the best version of the file further comprises determining which version is the most recent, openable version.

5. The method of claim 2, further comprising the step of storing a record block in the registry comprising data needed to analyze which version is the best version available to the user.

6. The method of claim 5, wherein the data comprises one or more DRPs.

7. The method of claim 6, wherein the one or more DRPs further comprise:

a path name, wherein the path name is the respective directory location of the recovery, auto-saved, and user-saved versions of the open file;

a time stamp for the recovery, auto-saved, and user-saved versions of the open file; and a numeric identifier which relates the recovery, auto-saved, and user-saved versions of the open file.

8. The method of claim 1, further comprising the steps of:

displaying a dialog box —or other form of user interface—requesting instructions from a user regarding whether the open file should be saved; and receiving instructions from the user to save the file.

9. A system for recovering information during a failure in program module on a user's computer comprising:

an exception handler residing on the user's computer for storing a recovery version of an open file, wherein the recovery version is a version of the file as it was at the time of the failure in the program module.

10. The system of claim 9, wherein the exception handler is a Global Unhandled Exception Handler that may be easily added to the software program without extensive changes to the program's architecture.

11. The system of claim 9, further comprising:

DRPs stored in the user's computer' registry, wherein the DRPs store data relating to the recovery version, a user-saved version, and an auto-saved version of the open file.

12. The system of claim 11, wherein the DRPs further:

a path name, wherein the path name is the respective directory location of the recovery, auto-saved, and user-saved versions of the open file;

a time stamp for the recovery, auto-saved, and user-saved versions of the open file; and a numeric identifier which relates the recovery, auto-saved, and user-saved versions of the open file.

13. The system of claim 12, wherein the DRPs further comprise:

a process identifier used to detect whether a DRP is still in use by another running instance of the executable program;

a unique numeric identifier for each version of the open file; and a friendly name which is descriptive of the version.

14. A computer-readable medium for recovering information from an open file during a failure in a program module, having computer-executable instructions for performing, the steps of:

determining there is a failure in the program module;

in response to a determination that there is a failure in the program module, storing a recovery version of the file, wherein the recovery version is a version of the file as it was at the time of the failure in the program module;

terminating the program module;

restarting the program module; and displaying the recovery version of the file.

15. The computer-readable medium of claim 14, further comprising the steps of:

providing a user of the program module with an auto-saved version of the file;

providing the user of the program module with a user-saved version of the file; and providing a means to select among an auto-saved version, a user-saved version, and a recovery version of the file.

16. The computer-readable medium of claim 15, further comprising the step of determining which is the best version of the file.

17. The computer-readable medium of claim 16, wherein the step of determining which is the best version of the file further comprises determining which version is the most recent, openable version.

18. The computer-readable medium of claim 15, further comprising the step of storing a record block in a registry comprising data needed to analyze which version is the best version available to the user.

19. The computer-readable medium of claim 18, wherein the data comprises one or more DRPs.

20. The computer-readable medium of claim 19, wherein the one or more DRPs further comprise:

a path name, wherein the path name is the respective directory location of the recovery, auto-saved, and user-saved versions of the open file;

a time stamp for the recovery, auto-saved, and user-saved versions of the open file; and a numeric identifier which relates the recovery, auto-saved, and user-saved versions of the open file.

21. The computer-readable medium of claim 14, further comprising the steps of:

displaying a dialog box—or other form of user interface—requesting instructions from a user regarding whether the open file should be saved; and receiving instructions from the user to save the file.

22. A method for recovering information from an open file during a failure in a program module, the method comprising the steps of:

determining there is a failure in the program module;

in response to a determination that there is a failure in the program module, storing a recovery version of the file at the time of the failure;

terminating the program module;

restarting the program module;

displaying the recovery version of the file;

providing a user of the program module with an auto-saved version of the file;

providing the user of the program module with a user-saved version of the file; and providing a means to select among an auto-saved version, a user-saved version, and a recovery versions of the file.

23. A method of recovering information from an open file during a failure in a program module, the method comprising the steps of:

determining there is a failure in the program module;

in response to a determination that there is a failure in the program module, storing a recovery version of the file at the time of the crash;

terminating the program module;

restarting the program module;

displaying the recovery version of the file; and displaying a dialog box—or other form of user interface—requesting instructions from a user regarding whether the open file should be saved; and receiving instructions from the user to save the file.

24. A system for recovering information during a failure in a program module on a user's computer comprising:

an exception handler residing on the user's computer for storing a recovery version of an open file upon detection of a failure in the program module, wherein the exception handler is a Global Unhandled Exception Handler that may be easily added to the software program without extensive changes to the program's architecture.

25. A system for recovering information during a failure in a program module on a user's computer comprising:

an exception handler residing on the user's computer for storing a recovery version of an open file upon detection of a failure in the program module; and DRPs stored in the user's computer's registry, wherein the DRPs store data relating to the recovery version, a user-saved version, and an auto-saved version of the open file.

26. A computer-readable medium for recovering information from an open file during a failure in a program module, having computer-executable instructions for performing the steps of:

determining there is a failure in the program module;

in response to a determination that there is a failure in the program module, storing a recovery version of the file at the time of the crash;

terminating the program module;

restarting the program module;

displaying the recovery version of the file;

providing a user of the program module with an auto-saved version of the file;

providing the user of the program module with a user-saved version of the file; and providing a means to select among an auto-saved version, a user-saved version, and a recovery version of the file.

27. A computer-readable medium for recovering information from an open file during a failure in a program module, having computer-executable instructions for performing the steps of:

determining there is a failure in the program module;

in response to a determination that there is a failure in the program module, sorting a recovery version of the file at the time of the crash;

terminating the program module;

restarting the program module;

displaying the recovery version of the file;

displaying a dialog box—or other form of user interface—requesting instructions from a user regarding whether the open file should be saved; and receiving instructions from the user to save the file.

\* \* \* \* \*

UNITED STATES PATENT AND TRADEMARK OFFICE
CERTIFICATE OF CORRECTION

PATENT NO. : 6,701,454 B1
DATED : March 2, 2004
INVENTOR(S) : Fischer et al.

It is certified that error appears in the above-identified patent and that said Letters Patent is hereby corrected as shown below:

Column 1,
Line 15, "terminates the, software program" should read -- terminates the software program --

Column 5,
Line 3, "depending the particular" should read -- depending on the particular --

Column 9,
Line 2, "providing a means to" should start a new paragraph
Line 32, "during a failure in" should read -- during a failure in a --.
Line 47, "wherein the DRPs further:" should read -- wherein the DRPs further comprise: --.
Line 66, "for performing, the" should read -- for performing the --

Signed and Sealed this

Twenty-seventh Day of July, 2004

JON W. DUDAS
*Acting Director of the United States Patent and Trademark Office*